No. 814,578.   PATENTED MAR. 6, 1906.
J. WALTER.
LUNCH PAIL.
APPLICATION FILED MAR. 21, 1905.

WITNESSES
Louis D. Heinrichs
Herbert D. Lawson

INVENTOR
John Walter
By W. T. Fitzgerald & Co.,
Attorneys

UNITED STATES PATENT OFFICE.

JOHN WALTER, OF OTTAWA, ILLINOIS.

LUNCH-PAIL.

No. 814,578.     Specification of Letters Patent.     Patented March 6, 1906.

Application filed March 21, 1905. Serial No. 251,313.

*To all whom it may concern:*

Be it known that I, JOHN WALTER, a citizen of the United States, residing at Ottawa, in the county of Lasalle and State of Illinois, have invented certain new and useful Improvements in Lunch-Pails; and I do hereby declare the following to be a full, clear, and exact description of the invention, such as will enable others skilled in the art to which it appertains to make and use the same.

My invention relates to lunch-pails; and its object is to provide a device of this character which comprises in its construction a lunch-receptacle, a frying-pan, means for heating the same, and a cover which also serves the purpose of a receptacle for liquid, such as coffee.

Another object is to provide a combination device of this character which is extremely compact and durable and the parts of which can be readily set up for use.

With the above and other objects in view the invention consists of a pail having a cover or closure which is hollow. The inlet and outlet of this cover is surrounded by a flange adapted to project into and hold a cup. A partition separates the body of the receptacle into two compartments, one adapted to contain food, while the other is provided with a lamp. A saucepan is also normally disposed in the compartment with the lamp and adapted to be supported above the lamp when food is to be heated in the saucepan. A dish is also normally arranged above the food-compartment and constitutes an auxiliary closure therefor.

The invention also consists of the further novel constructions and combinations of parts hereinafter more fully described, and pointed out in the claims.

In the accompanying drawings I have shown the preferred form of my invention.

Figure 1:
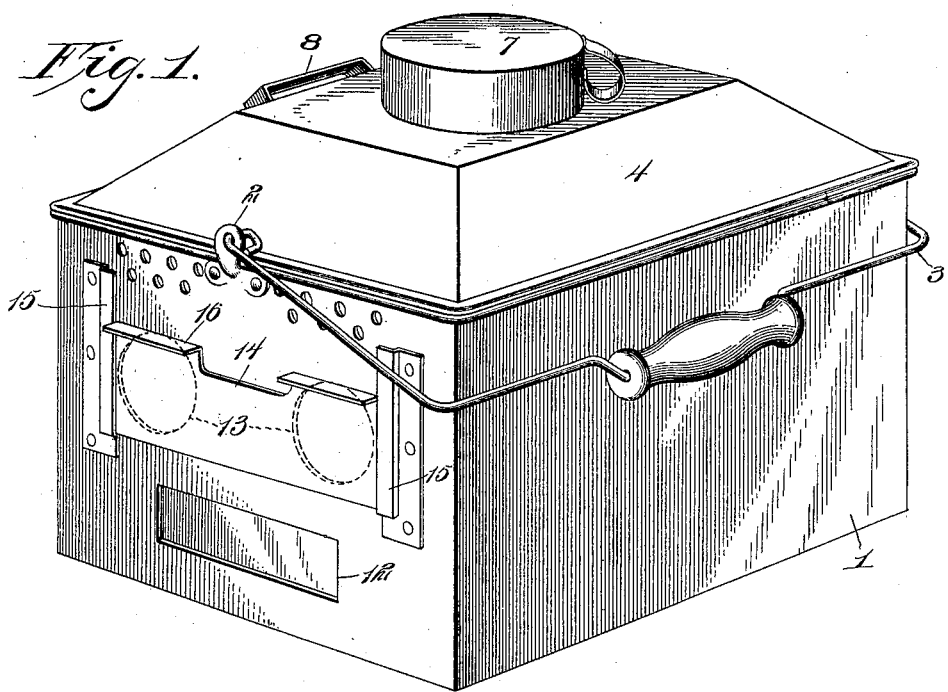
Figure 2:
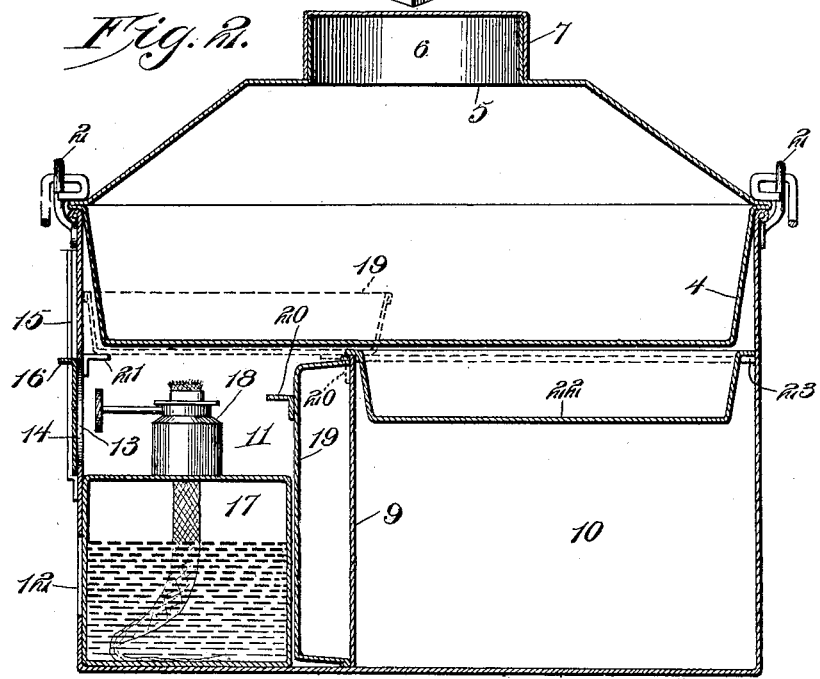

In said drawings, Figure 1 is a perspective view of my invention, and Fig. 2 is a vertical section therethrough.

Referring to the figures by numerals of reference, 1 is the body of my improved dinner-pail, and the same is provided at opposite ends with ears 2, which form connections for the bail 3 of the device. A closure or cover 4 is adapted to fit within the top of the body 1 and to extend thereabove, and this closure is hollow, so as to be capable of holding coffee or other liquid. The liquid is to be poured into or from the cover through an opening 5, arranged in the top thereof and which is surrounded by a flange 6. This opening is normally closed by a cup 7, which is adapted to be inverted and placed upon the flange, as shown. A handle 8 extends from the cover 4 to facilitate the removal of the same from the body 1.

A partition 9 extends from one side to the other of the body and from the bottom thereof to a point close to the closure 4, and this partition divides the body into two compartments—to wit, a food-compartment 10 and a heating-compartment 11. The front wall of this heating-compartment has an air-inlet opening 12 near the bottom thereof, and air-openings 13 are located thereabove and are normally closed by a slide 14, the ends of which are held by guide-cleats 15, secured to the wall of the body. Ears 16 extend from slide 14, so as to enable the same to be readily manipulated.

A lamp is located within the compartment 11 and comprises an oil-receptacle 17, upon which are located, preferably, two burners 18, one of these burners being disposed in rear of each opening 13, so that the wick can be easily raised or lowered. The receptacle 17 is not as wide as the compartment in which it is located, and sufficient room is left between it and the partition 9 to receive a saucepan 19 when the same is placed upon one of its sides. The width of this saucepan is slightly greater than that of compartment 11, and the same is provided along the bottom with a retaining-flange 20. A bracket 21 is secured to the front wall of compartment 11 in alinement with the top or partition 9. A plate 22 is normally supported by the upper edge of partition 9 and by supporting-cleats 23, which extend along the sides of the compartment 10.

The parts of the device are normally in the positions shown in the drawings. It will be understood that the cover 4 can contain a suitable liquid, such as coffee or water, and food can be placed within the compartment 10. If it is desired to heat some of the food in the saucepan, the cover 4 and the saucepan are removed and the lamp moved from the opening 12 and lighted. The saucepan is then placed on the partition 9 and bracket 21, with its flange 20 depending into the compartment 11, so as to hold the pan against displacement. I have shown this position of the saucepan by dotted lines in Fig. 2. Combustion will be supported by air entering the opening 12. Plate 22 can be utilized for holding the food after it has been heated, and it will of course be understood that the liquid contents of the cover can be readily poured into the cup 7 after the same has been removed from flange 6.

It will be seen that this device is extremely compact and convenient and is especially adapted for use by hunters and other persons spending considerable time at points out of convenient reach of stoves and other cooking conveniences.

Having thus fully described my invention, what I claim as new, and desire to secure by Letters Patent, is—

1. A device of the character described comprising a body subdivided into compartments; a heater within one of the compartments, a bracket within said compartment with the heater, a saucepan adapted to be supported by the bracket and one wall of the compartment, and means upon the saucepan for preventing its displacement when in such position.

2. In a device of the character described the combination with a body subdivided into compartments; of a heater in one of said compartments, said compartment having apertures in one wall, means for normally closing the apertures, a bracket within the compartment with the heater, a saucepan adapted to be supported by the bracket and one wall of the compartment, and means depending from the saucepan for engaging the wall to prevent displacement of the saucepan when in such position.

3. In a device of the character described the combination with a body having apertures in one wall and means for normally closing the apertures; of a burner within the body, a partition adjacent thereto forming compartments within the body, a bracket in the compartment with the burner, a saucepan adapted to rest upon the partition and bracket, and a depending device upon the saucepan for contacting with the partition to prevent displacement of the pan.

In testimony whereof I have signed my name to this specification in the presence of two subscribing witnesses.

JOHN WALTER.

Witnesses:
   JAMES W. BALDWIN,
   AUGUST HARDTEN.